United States Patent
Chapple et al.

(10) Patent No.: US 10,071,766 B2
(45) Date of Patent: Sep. 11, 2018

(54) SUBFRAME FOR A PASSENGER VEHICLE

(71) Applicant: Autotech Engineering Deutschland GmbH, Bielefeld (DE)

(72) Inventors: Adrian Chapple, Durham (GB); John Tolley, Durham (GB); Michael Matthews, Durham (GB); Philip Manton, Yorkshire (GB)

(73) Assignee: Autotech Engineering Deutschland GmbH, Bielefeld (DE)

( * ) Notice: Subject to any disclaimer, the term of this patent is extended or adjusted under 35 U.S.C. 154(b) by 40 days.

(21) Appl. No.: 15/221,863

(22) Filed: Jul. 28, 2016

(65) Prior Publication Data
US 2017/0029029 A1 Feb. 2, 2017

(30) Foreign Application Priority Data
Jul. 29, 2015 (EP) .................................... 15178953

(51) Int. Cl.
*B62D 21/11* (2006.01)
*B62D 21/02* (2006.01)

(52) U.S. Cl.
CPC .............. *B62D 21/02* (2013.01); *B62D 21/11* (2013.01)

(58) Field of Classification Search
CPC .................................................... B62D 21/11
See application file for complete search history.

(56) References Cited

U.S. PATENT DOCUMENTS

| 4,033,243 A * | 7/1977 | Kirrish ................... F16B 37/145 411/338 |
| 7,520,514 B2 * | 4/2009 | Ogawa ..................... B60G 3/20 180/312 |
| 8,540,261 B2 * | 9/2013 | Okamoto ............... B62D 21/11 280/124.109 |
| 2003/0160415 A1 * | 8/2003 | Kim ....................... B62D 21/11 280/124.109 |
| 2007/0024044 A1 * | 2/2007 | Ogawa ..................... B60G 3/20 280/788 |
| 2007/0169982 A1 | 7/2007 | Ogawa et al. |
| 2014/0265206 A1 | 9/2014 | Stockard |
| 2017/0066301 A1 * | 3/2017 | Terashima ......... B60G 21/0551 |

(Continued)

FOREIGN PATENT DOCUMENTS

| CN | 102781689 A | 11/2012 |
| CN | 104044424 A | 9/2014 |

(Continued)

*Primary Examiner* — James A English
(74) *Attorney, Agent, or Firm* — The Webb Law Firm

(57) ABSTRACT

The invention relates to a subframe for a passenger vehicle. The subframe includes at least two longitudinal members, at least one crossmember which interconnects the longitudinal members, vehicle body connecting elements for connecting the subframe to a vehicle body, and at least one control arm connection for each side of the vehicle. The control arm connection has at least one insert part which is received in an interlocking manner in an opening of the subframe and is integrally and/or frictionally connected to the subframe. The insert part has a connecting portion for forming a screw connection and being chosen from a group comprising at least two different insert parts, the various insert parts differing from one another in terms of the vertical position of the connecting portion.

15 Claims, 5 Drawing Sheets

(56) References Cited

U.S. PATENT DOCUMENTS

| | | | |
|---|---|---|---|
| 2017/0066482 A1* | 3/2017 | Kaneko | B62D 25/2009 |
| 2017/0120953 A1* | 5/2017 | Tomikuda | B62D 21/11 |

FOREIGN PATENT DOCUMENTS

| | | |
|---|---|---|
| CN | 206155567 U | 5/2017 |
| DE | 102012021562 A1 | 5/2014 |
| DE | 102012111461 A1 | 5/2014 |
| DE | 102014102815 A1 | 9/2014 |
| JP | 2003154966 A | 5/2003 |
| JP | 201090922 A | 4/2010 |

\* cited by examiner

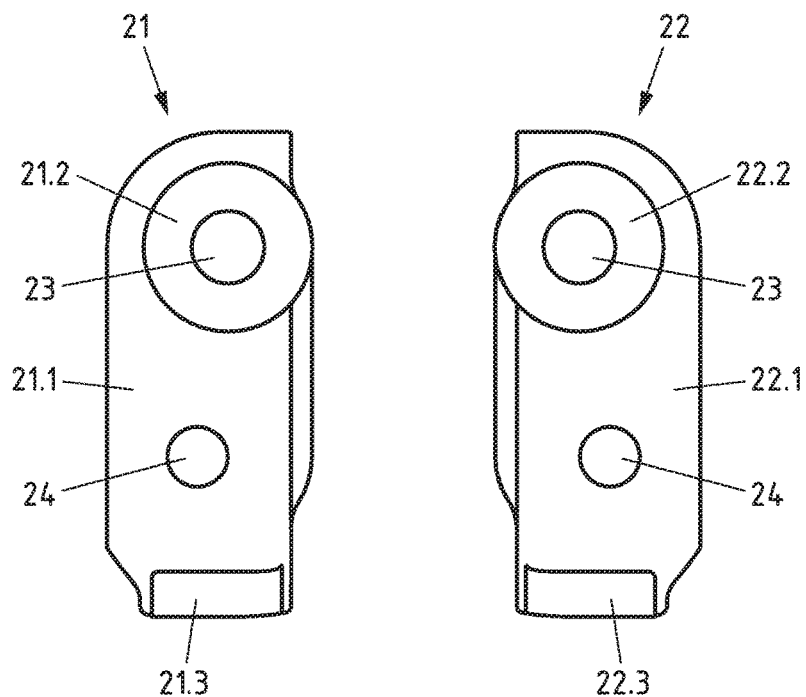
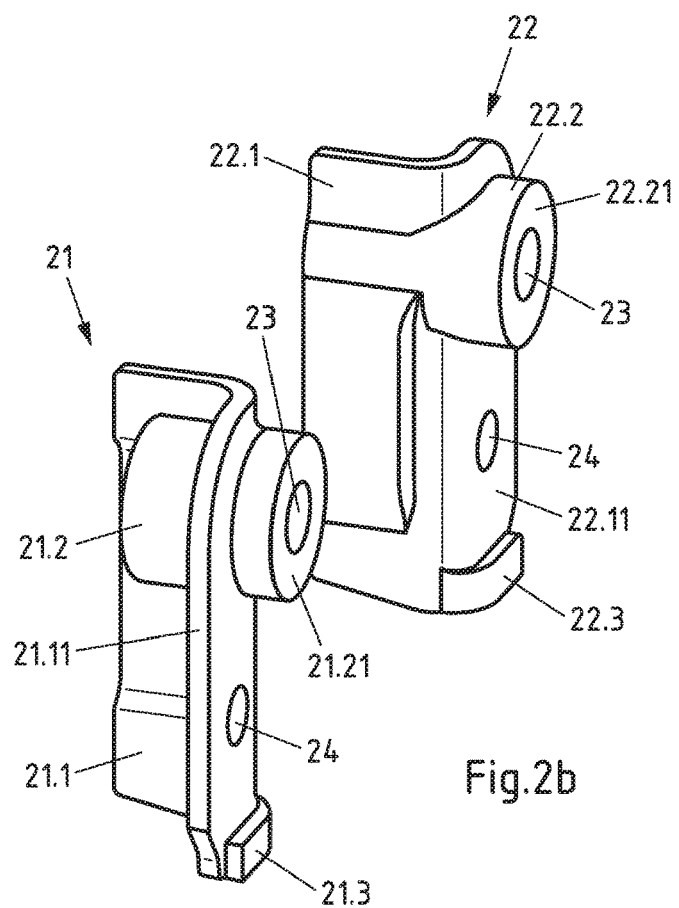
Fig.2a
Fig.2b

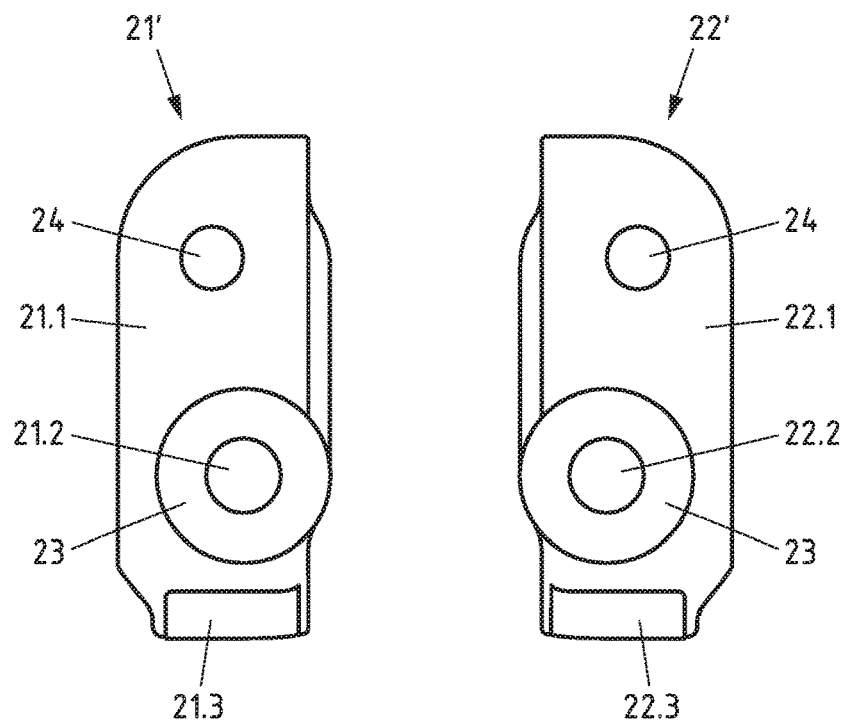
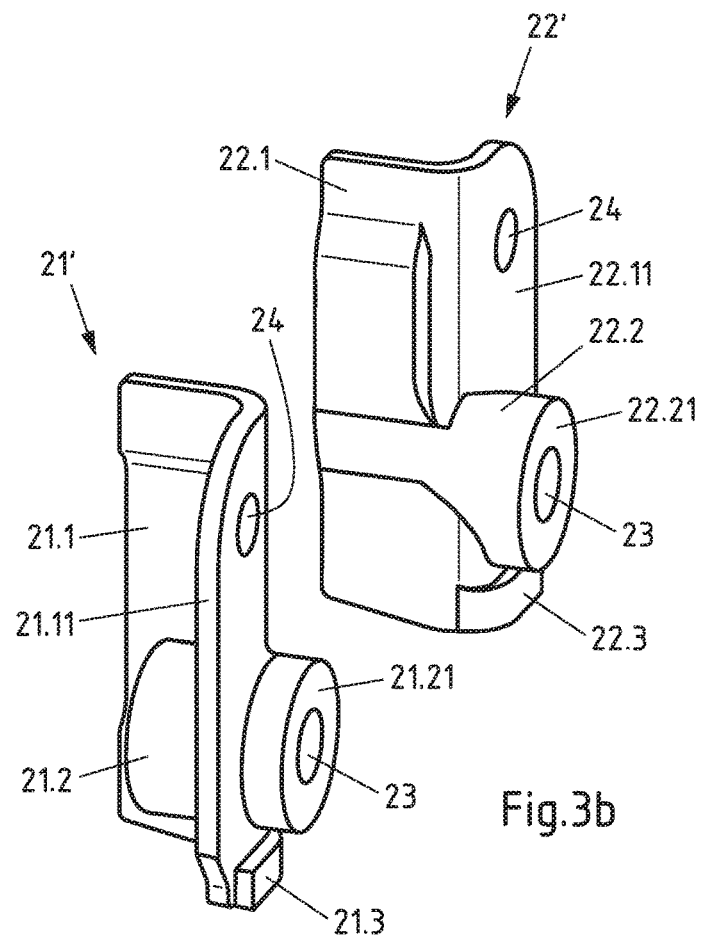

SUBFRAME FOR A PASSENGER VEHICLE

CROSS-REFERENCE TO RELATED APPLICATION

This application claims priority to European Patent Application No. 15178953.4 filed Jul. 29, 2015, the disclosure of which is hereby incorporated in its entirety by reference.

BACKGROUND OF THE INVENTION

Field of the Invention

The invention relates to a subframe, in particular a rear axle subframe, for a passenger vehicle (passenger car), comprising at least two longitudinal members, at least one crossmember which interconnects the longitudinal members, vehicle body connecting elements for connecting the subframe to a vehicle body, and at least one control arm connection for each side of the vehicle.

The expression "longitudinal member" is understood here to mean supporting elements or portions of supporting elements of the subframe which, in the mounted state of the subframe, extend substantially along the longitudinal axis of the passenger vehicle in question.

Description of Related Art

Such subframes, also referred to as axle beams, are known in many different embodiments (see, for example, DE 10 2012 021 562 A1 and DE 10 2012 111 461 A1). They are intended to be as light as possible while having high strength and rigidity and conventionally have control arm connections (bearing seats) for wheel guide elements and other assemblies in order, as a pre-mounting unit, to permit the fitting of complete front or rear axle modules comprising drive units.

As well as offering passenger vehicles having relatively low ground clearance, many automobile manufacturers also offer similar passenger vehicles having relatively high ground clearance, in particular what are known as SUVs (sport utility vehicles). Although the body and drive unit of a passenger vehicle that has a relatively high ground clearance often scarcely differ from the body and drive unit of a passenger vehicle having relatively low ground clearance, different subframes are manufactured or provided for the two vehicle variants because the control arms are suspended at different heights in order to achieve the different ground clearances. This results in relatively high manufacturing costs.

SUMMARY OF THE INVENTION

An object of the invention is to provide a subframe of the type mentioned at the outset which makes it possible to specify as late as possible in the manufacturing process whether the subframe is manufactured for a passenger vehicle having relatively high ground clearance or having relatively low ground clearance.

This object is achieved by a subframe having the features described herein.

The subframe according to the invention is characterised in that its control arm connection has at least one insert part which is received in an interlocking manner in an opening in the subframe and is integrally and/or frictionally connected to the subframe, the insert part having a connecting portion for forming a screw connection and being chosen from a group comprising at least two different insert parts, the various insert parts differing from one another in terms of the vertical position of the connecting portion.

The invention is based on the concept of providing a variably adjustable control arm suspension, in particular a trapezoidal control arm suspension, on a subframe of the type mentioned at the outset, by means of various insert parts which differ from one another in terms of the vertical position of a connecting portion provided thereon.

The subframe according to the invention makes it possible to specify relatively late in the subframe manufacturing process whether the subframe is to be mounted on a body of a vehicle having relatively high ground clearance or on a body of a vehicle having relatively low ground clearance. Until integration of the chosen vehicle-variant-specific insert part, which has the connecting portion for control arm connection arranged at different heights depending on the vehicle variant (SUV or normal saloon chassis), the subframe according to the invention is what is known as a carry-over part for different vehicle variants. The manufacturing costs of such subframes can thereby be reduced considerably.

An advantageous embodiment of the subframe according to the invention is characterised in that the control arm connection has at least two insert parts for each side of the vehicle, which insert parts are received in an interlocking manner in openings in the subframe that are spaced apart in the longitudinal direction of the vehicle, and are integrally and/or frictionally connected to the subframe, each insert part having a connecting portion for forming a screw connection and being chosen from a group comprising at least two different insert parts, the various insert parts differing from one another in terms of the vertical position of the connecting portion. This embodiment, while having a low component weight, permits a robust and space-saving connection of a dog-bone-shaped hinge rod which extends through a hinge bearing bush ("dog bone bush") connected to the vehicle control arm, for example trapezoidal control arm. The openings receiving the insert parts are preferably arranged in edge portions of the subframe which extend substantially vertically or in the direction of the vertical axis of the vehicle and delimit a recess for receiving in part a control arm end.

According to a further advantageous embodiment of the subframe according to the invention, each opening receiving the insert part is formed in a sheet metal formed part integrated in the subframe. A corresponding sheet metal formed part reinforces the subframe, while the weight of the sheet metal formed part is only low or the weight of the sheet metal formed part can even be compensated for by reducing the material thickness of other portions of the subframe.

A further advantageous embodiment of the invention provides for the opening receiving the insert part to have an asymmetrical inner contour, the insert part having a peripheral contour that is complementary to the inner contour. Insertion of the insert part into the associated opening in the correct position is thereby facilitated or ensured.

Each insert part is preferably produced from a metal casting, the connecting portion for forming a screw connection for the control arm connection being in the form of a threaded hole in the metal casting. A complex geometry of the insert part can thus be achieved in a material-saving and thus inexpensive manner. In particular, a relatively long threaded hole for achieving a strong frictional connection can thus be achieved inexpensively, while the insert part is of low weight. The threaded hole is preferably provided in a bush-like portion of the insert part. The length of the threaded hole is then greater than its inside diameter. The length of the threaded hole is preferably more than twice its inside diameter.

In order that the insert part, while being of low weight, permits a strong frictional connection and particularly reliable connection of the chassis control arm to the threaded hole, the bush-like portion preferably has an end face which protrudes relative to an outer side of the insert part. The protruding end face forms a contact surface or clamping surface for the element of the chassis control arm that is to be screwed on, for example for the dog-bone-shaped hinge rod (dog bone) of the hinge bearing bush connected to the chassis control arm.

With regard to a low weight of the insert part and the use of a relatively short dog-bone-shaped hinge rod, it is advantageous if, according to a further embodiment of the invention, the bush-like portion of the insert part terminates radially with an outer side of the insert part or protrudes radially relative to said outer side.

The insert part inserted into the associated opening can be rigidly connected to the subframe in various ways. Preferably, each insert part is welded and/or soldered and/or adhesively bonded to the subframe. Alternatively, the insert part inserted into the associated opening can also be connected to the subframe in a releasable manner by means of a screw connection.

A further preferred embodiment of the subframe according to the invention is characterised in that the bottom end of the opening receiving the insert part is delimited by a plate-like portion of the subframe that is arranged substantially horizontally. When the region of the subframe in which the opening for receiving one of the at least two different insert parts for the variable adjustment of the vertical position of the control arm suspension is provided has predetermined dimensions, this embodiment allows the opening, and thus the different insert parts, to be designed to be relatively high in order to be able to vary the vertical position of the control arm suspension, and thus the ground clearance of the vehicle in question, by as large a degree as possible. In addition, the rigidity of the subframe in the region of the control arm suspension can be increased considerably by means of the plate-like portion of the subframe that is arranged substantially horizontally.

In this connection, a further embodiment of the invention provides that the insert part has a thickened, outwardly protruding edge portion at its end facing the plate-like portion. An optimal welded connection for fixing the insert part to the subframe can be achieved at such an edge portion, in particular when other portions of the insert part are designed to be relatively thin for reasons of weight reduction.

It is further advantageous if, in the above-mentioned embodiment of the subframe according to the invention in which the control arm connection has two insert parts on each side of the vehicle, which insert parts are received in openings which are spaced apart, and are integrally and/or frictionally connected to the subframe, and in which the bottom end of each opening is delimited by a plate-like portion of the subframe that is arranged substantially horizontally, said plate-like portion has a recess between the openings. Control arm suspension of variable height can thus be achieved in as space-saving a manner as possible.

According to a further embodiment of the subframe according to the invention, each insert part has at least one through-hole in addition to the threaded hole or the connecting portion for forming a screw connection. The through-hole can be used for inserting a corresponding tool for handling the insert part during introduction thereof into the associated opening of the subframe. In addition, water, which could otherwise collect behind the insert part, is able to run away through the through-hole.

The subframe according to the invention is preferably in the form of a welded frame structure, the longitudinal members and/or the at least one crossmember being formed of or assembled from sheet metal formed parts.

BRIEF DESCRIPTION OF THE DRAWINGS

The invention will be explained below with reference to a drawing showing embodiments. In the drawing:

FIGS. 2a and 2b are front and perspective views, respectively, of two insert parts for setting a low control arm suspension and thus low ground clearance of the passenger vehicle;

FIGS. 3a and 3b are front and perspective views, respectively, of two insert parts for setting a high control arm suspension and thus high ground clearance of the passenger vehicle;

DETAILED DESCRIPTION OF THE INVENTION

Figure 1:
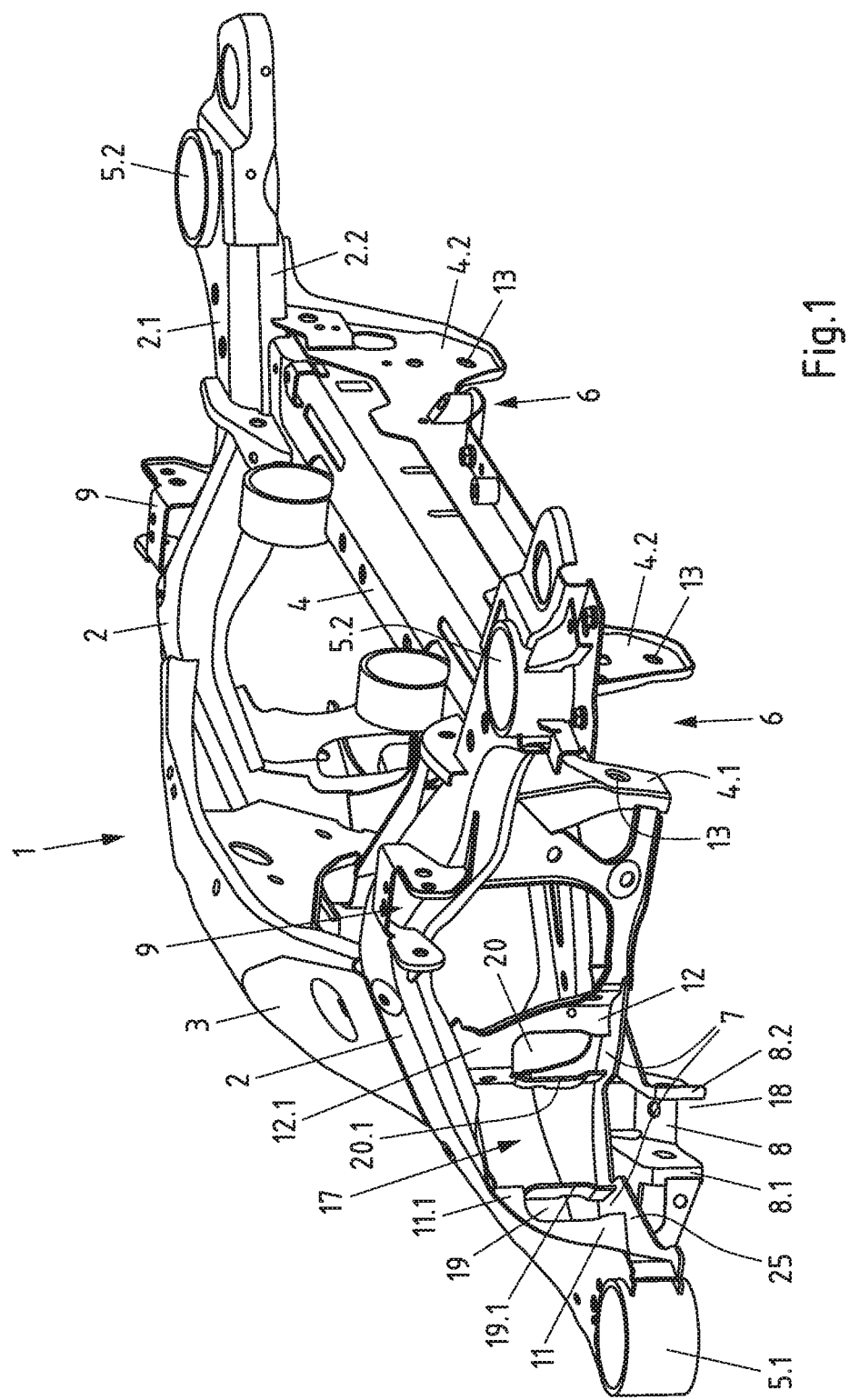
FIG. 1 is a perspective view of a subframe according to the invention for a passenger vehicle, having openings for receiving insert parts for the variable height adjustment of the control arm suspension.
Figure 4:
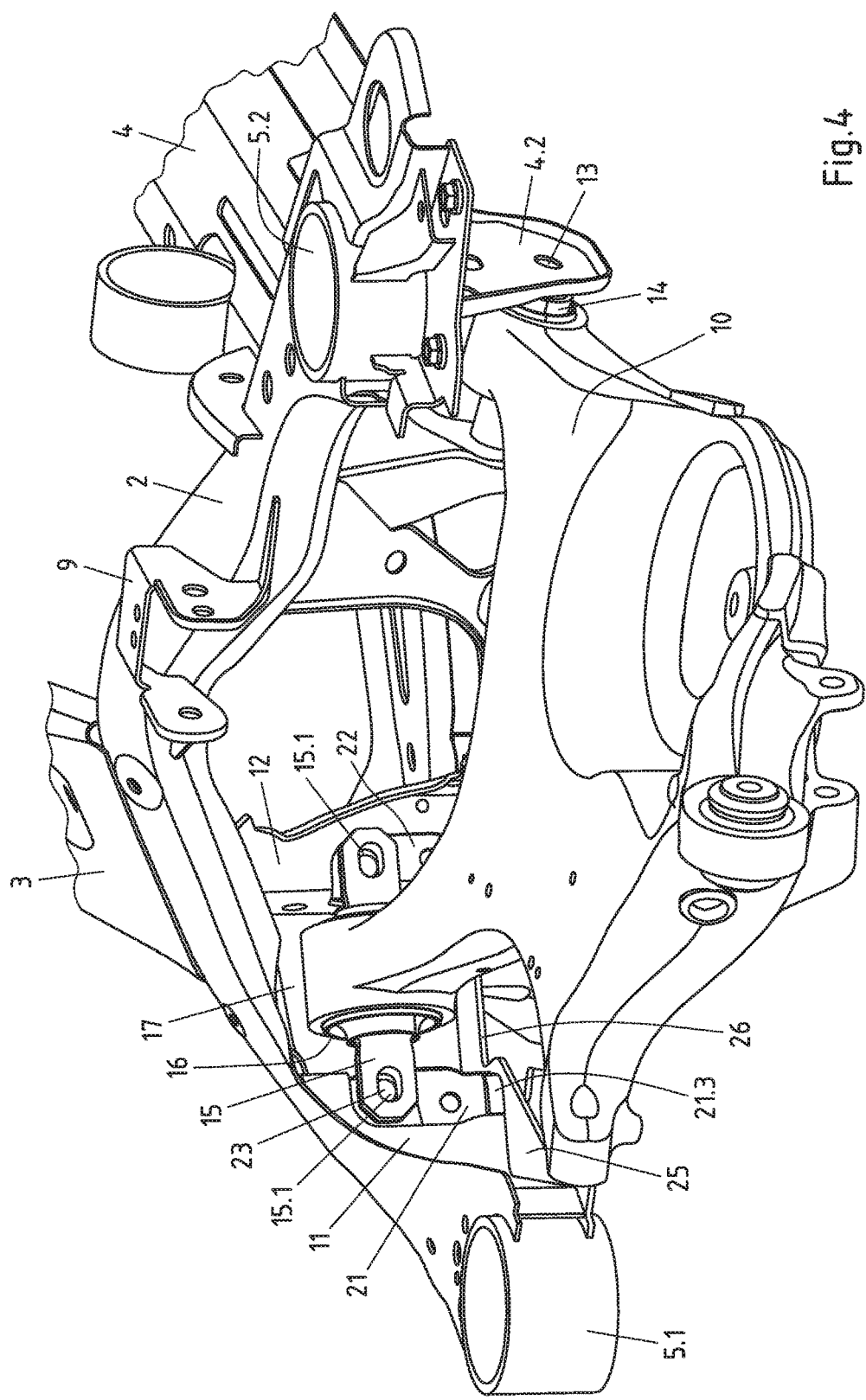
FIG. 4 shows a portion of the subframe according to FIG. 1 having insert parts according to FIG. 2a and FIG. 2b received in the openings, as well as a crossmember mounted thereon.
Figure 5:
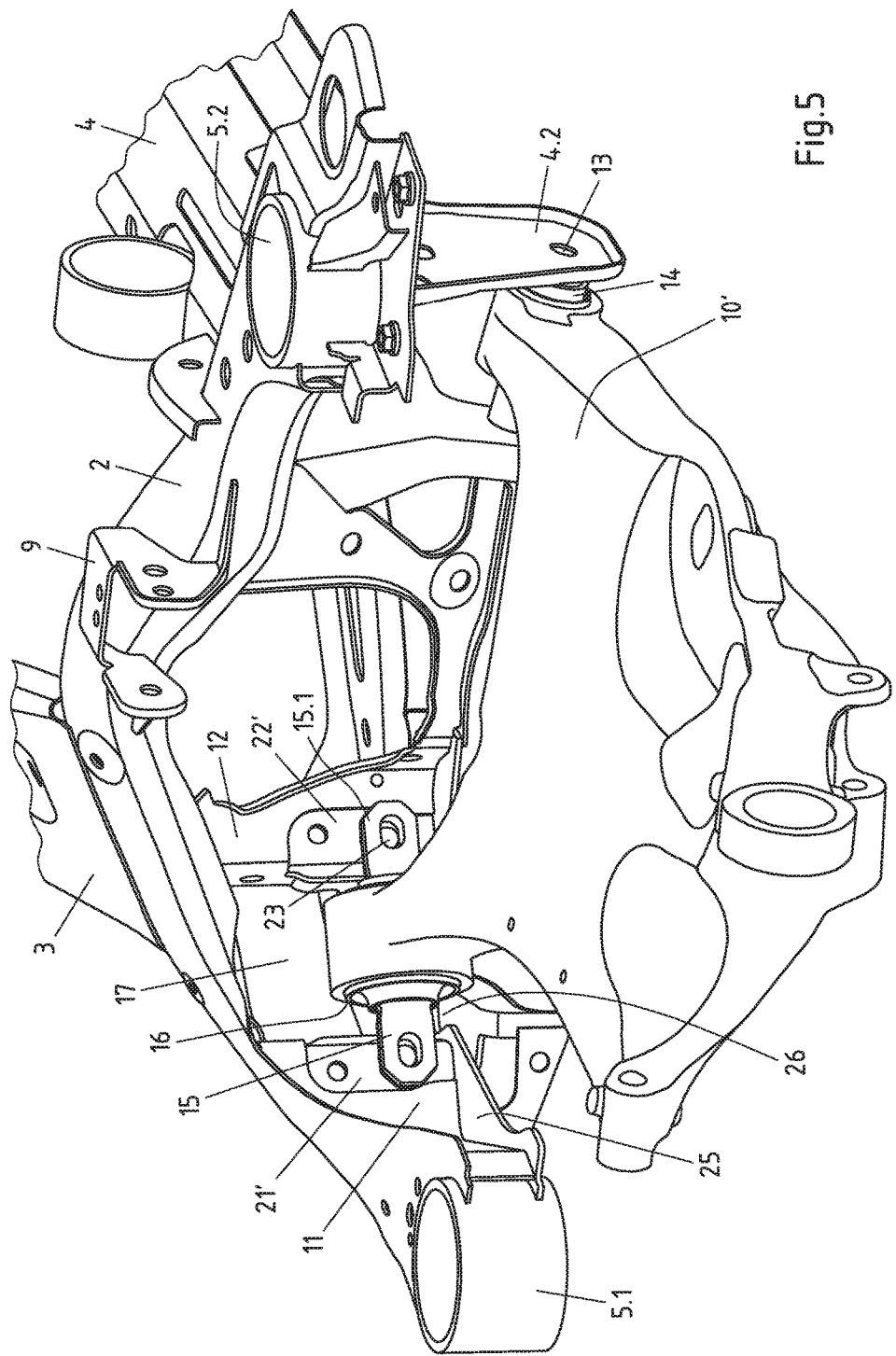
FIG. 5 shows the portion of the subframe according to FIG. 1 having insert parts according to FIG. 3a and FIG. 3b received in the openings, as well as a crossmember mounted thereon.

The subframe 1 shown in FIGS. 1, 4 and 5 is intended for a passenger vehicle. The subframe is in the form of a rear axle subframe here, by way of example.

The subframe 1 is assembled from two longitudinal members 2 extending substantially in the longitudinal direction of the vehicle, a first or front crossmember 3, and a second or rear crossmember 4. The two crossmembers 3, 4, which are spaced apart in the longitudinal direction of the vehicle, interconnect the longitudinal members 2, so that a frame or a space bounded by the members 2, 3, 4 is obtained.

The subframe 1 is in the form of a welded frame structure. The longitudinal members 2 and the crossmembers 3, 4 are preferably formed of sheet metal formed parts, particularly preferably sheet steel formed parts. The longitudinal members 2 are substantially tubular and are assembled from sheet metal shells 2.1, 2.2 which are welded together. For connecting the subframe 1 to a vehicle body, connecting elements 5.1, 5.2 are provided at the ends of the longitudinal members. The body connecting elements 5.1, 5.2 are formed of pipe sockets or bushes which are welded to the longitudinal members 2 and into which bearings, preferably bearings having rubber bushes, are inserted or pressed.

The subframe 1 further has control arm connections 6, 7, 8, 9 for a right-hand and a left-hand wheel suspension. In the embodiment shown, two control arm connections 6, 7, which are spaced apart in the longitudinal direction of the vehicle, are provided on each side of the vehicle for a transverse control arm 10, 10' in the form of a triangular or trapezoidal control arm. The rear control arm connection 6 for the transverse control arm 10, 10' is arranged at the end of the rear crossmember 4, while the front control arm connection 7 is provided on sheet metal formed parts 11, 12 which are connected to the longitudinal member 2 and are substantially or mainly arranged between the front body connecting element 5.1 and the front crossmember 3.

The rear control arm connection 6 is formed by downwardly protruding, spaced apart tabs or portions 4.1, 4.2 of the rear crossmember 4, the portions 4.1, 4.2 having mutually aligned through-holes 13 for receiving a hinge pin (not shown). The hinge pin extends, in the mounted state of the transverse control arm 10, 10', through a bearing bush 14 connected to the transverse control arm 10, 10'.

The front control arm connection 7 is preferably designed for connection of a bearing bush 16 of the transverse control arm 10, 10', which bearing bush has a "dog-bone-shaped" hinge pin 15 (see FIGS. 4 and 5). The ends of the "dog-bone-shaped" hinge pin 15 are flattened and have through-holes 15.1 for receiving bolts. The hinge pin 15 is fixed to the sheet metal moulded parts 11, 12 delimiting a recess or niche 17, the bearing bush 16 associated with the hinge pin 15 projecting in part into the recess (niche) 17 in the mounted state of the transverse control arm 10, 10'.

An upper control arm connection 9 and a lower control arm connection 8 for each side of the vehicle are additionally provided on the subframe 1. The upper control arm connection 9 consists of a forked sheet metal formed part which is welded to the upper side or outer side of the respective longitudinal members 2. In this case, the forked sheet metal formed part 9 protrudes relative to the outer side of the longitudinal member 2.

The lower control arm connection 8 is arranged below the front control arm connection 7 intended for the transverse control arm (triangular or trapezoidal control arm) 10, 10'. Said lower control arm connection is formed of a sheet metal bracket, for example, which has a recess or receiver 18 for a bearing bush, the receiver (recess) 18 being delimited by surface portions of the sheet metal bracket 8.1, 8.2 which are spaced apart and have mutually aligned through-holes for receiving a hinge pin. The sheet metal bracket 8 is welded to the sheet metal formed parts 11, 12 of the front control arm connection 7. Alternatively, the sheet metal bracket 8 can be formed, at least in part, in one piece with one of the sheet metal formed parts 11, 12.

According to the invention, the front control arm connection (control arm suspension) 7 of the subframe 1 is designed to be variably adjustable, so that it can be specified as late in the manufacturing process as possible whether the subframe 1 is to be inserted into a vehicle having high ground clearance, for example into a SUV, or into a vehicle having low ground clearance, for example a relatively low-slung saloon. For this purpose, the sheet metal formed parts 11, 12 have openings 19, 20 for receiving insert parts (inserts) 21, 22, 21', 22' in an interlocking manner.

Each insert part 21, 22, 21', 22' has a connecting portion for a screw connection, preferably a nut or threaded hole 23, and is chosen from a group which comprises at least two different insert parts 21, 22, 21', 22' of this kind, the various insert parts 21, 22, 21', 22' differing from one another in terms of the vertical position of the connecting portion (for example of the nut or threaded hole 23).

FIGS. 2a and 2b show right-hand and left-hand insert parts (inserts) 21, 22 for setting a low control arm suspension or low ground clearance, while FIGS. 3a and 3b show right-hand and left-hand insert parts (inserts) 21', 22' for setting a high control arm suspension, or high ground clearance.

The sheet metal formed parts 11, 12 of the subframe 1 are bent and have an elongate corner or edge portion 11.1, 12.1 which extends substantially vertically. The edge portions 11.1, 12.1 delimit the recess 17 which receives in part the arm end of the transverse control arm 10, 10'. The openings 19, 20 receiving the insert parts 21, 22 or 21', 22' are arranged in the corner or edge portion 11.1, 12.1 of the sheet metal formed parts 11, 12. The openings 19, 20 and the insert parts 21, 21', 22, 22' which can be inserted therein are preferably elongate, the longitudinal centre axis of the respective openings 19, 20 or of the insert parts 21, 22, 21', 22' extending substantially vertically or parallel to the vertical axis of the vehicle. Furthermore, it will be seen that the respective opening 19, 20 has an asymmetrical inner contour, the inner contour of the left-hand opening 19 being different from the inner contour of the right-hand opening 20 (see FIG. 1).

The left-hand insert parts 21, 21' and right-hand insert parts 22, 22' have different outer contours, so that only one of the right-hand insert parts 21, 21' can be inserted into the right-hand opening 19, while only one of the left-hand insert parts 22, 22' can be inserted into the left-hand opening 20. The right-hand insert parts 22, 22' have an outer contour which is substantially complementary to the inner contour of the right-hand opening 20 associated therewith. Correspondingly, the left-hand insert parts 21, 21' have an outer contour which is substantially complementary to the inner contour of the left-hand opening 19 associated therewith.

Each insert part 21, 22, 21', 22' preferably consists of a metal casting which can be welded to the associated sheet metal formed part 11, 12 of the subframe 1. The metal casting can be, for example, a steel casting. Alternatively, the insert parts can also be manufactured from light metal, for example from aluminium. The connection of the insert parts 21, 22, 21', 22' to the sheet metal formed parts 11, 12 can in particular also be in the form of a soldered or adhesively bonded connection.

Each insert part 21, 22, 21', 22' has an angular base body 21.1, 22.1 having a bush-like portion 21.2, 22.2 which is formed in one piece thereon and passes through the front or end limb 21.11, 22.11 of the base body 21.1, 22.1. The bush-like portion 21.2, 22.2 has an end face 21.21, 22.21 which protrudes relative to the front side of the insert part 21, 22, 21', 22'. The periphery of the bush-like portion 21.2, 22.2 terminates radially with the lateral outer face of the base body 21.1, 22.1, or protrudes slightly radially relative to said outer face, which delimits the recess 17 of the control arm connection 7.

As well as having the threaded hole 23, the insert part 21, 22, 21', 22' has at least one through-hole 24 spaced apart radially from the bush-like portion 21.2, 22.2. The through-hole 24 is used for handling of the insert part 21, 22, 21', 22' during insertion into the opening 19, 20 associated therewith. In addition, the insert part 21, 22, 21', 22' can have further through-holes (not shown), which are used as drainage holes, for example.

The bottom end of the openings 19, 20 receiving the insert parts 21, 22, 21', 22' is delimited by a plate-like sheet metal portion 25 of the subframe 1 that is arranged substantially horizontally. The plate-like sheet metal portion 25 has a recess 26 between the openings 19, 20 in order to create more clearance, in the bottom or lower position of the control arm suspension, for the transverse control arm 10, 10' which is to be connected in an articulated manner.

The insert part 21, 22, 21', 22' preferably has a thickened, outwardly protruding edge portion 21.3, 22.3 at its end facing the plate-like sheet metal portion 25. The insert part 21, 22, 21', 22' can thus be welded particularly reliably to the subframe 1, specifically to the plate-like sheet metal portion 25. The insert part 21, 22, 21', 22' is preferably connected by means of a continuous weld seam to the lower sheet metal portion 25 as well as to the vertical edge of the opening 19, 20 located in the recess 17 in the control arm connection 7.

FIG. 4 shows an installation situation in which the insert parts for a relatively low control arm suspension according to FIG. 2a have been inserted into the openings 19, 20 of the front control arm connection 7 and the dog-bone-shaped hinge pin 15 of the front bearing bush 16 of the transverse control arm 10 has been screwed to the threaded holes 23 of the insert parts 21, 22. The screws required therefor are not shown for the sake of clarity.

FIG. 5, in contrast, shows an installation situation in which the insert parts 21', 22' for a relatively high control arm suspension according to FIG. 3a have been inserted into the openings 19, 20 and the dog-bone-shaped hinge pin 15 of the front bearing bush 16 of the transverse control arm 10' has been screwed to the threaded holes 23. The screws are not shown here either. The transverse control arm or trapezoidal control arm 10' shown in FIG. 5 is different from the transverse control arm (trapezoidal control arm) shown in FIG. 4, which is intended for a passenger vehicle having relatively low ground clearance or control arm suspension.

The invention claimed is:

1. A method for manufacturing a subframe for a passenger vehicle comprising at least two longitudinal members, at least one crossmember which interconnects the at least two longitudinal members, vehicle body connecting elements for connecting the subframe to a vehicle body, and at least one control arm connection for each side of the vehicle, the method comprising:
   providing a first set of insert parts and a second set of insert parts, each insert part of the first set of insert parts and the second set of insert parts having a connecting portion for forming a screw connection;
   wherein the connecting portion of each insert part of the first set of insert parts is located at a first vertical position thereon, such that each insert part of the first set of insert parts is configured to provide the passenger vehicle with a first ground clearance when the subframe is connected to the vehicle body;
   wherein the connection portion of each insert part of the second set of insert parts is located at a second vertical position thereon, such that each insert part of the second set of insert parts is configured to provide the passenger vehicle with a second ground clearance when the subframe is connected to the vehicle body;
   selecting for installation a vehicle-variant-specific insert part from the first set of insert parts or the second set of insert parts based on which of the first ground clearance and the second ground clearance is required for the passenger vehicle; and
   inserting the selected vehicle-variant-specific insert part in an interlocking manner into an opening in the subframe associated with one of the at least one control arm connection such that the vehicle-variant-specific insert part is integrally and/or frictionally connected to the subframe.

2. The method according to claim 1, wherein the subframe comprises at least two openings for each side of the vehicle, the at least two openings being spaced apart in a longitudinal direction of the vehicle and being integrally and/or frictionally connected to the subframe, the method further comprising:
   inserting a second vehicle-variant-specific insert part in an interlocking manner into a second one of the at least two openings such that the second vehicle-variant-specific insert part is integrally and/or frictionally connected to the subframe.

3. The method according to claim 2, wherein the at least two openings are arranged in edge portions of the subframe which extend substantially vertically or in a direction of the vertical axis of the vehicle and delimit a recess for receiving in part a control arm end.

4. The method according to claim 1, wherein the opening receiving the vehicle-variant-specific insert part is formed in a sheet metal formed part integrated in the subframe.

5. The method according to claim 1, wherein the opening receiving the vehicle-variant-specific insert part has an asymmetrical inner contour, the vehicle-variant-specific insert part having a peripheral contour that is complementary to the inner contour.

6. The method according to claim 1, wherein the vehicle-variant-specific insert part is produced from a metal casting, the connecting portion for forming a screw connection being in the form of a threaded hole in the metal casting.

7. The method according to claim 6, wherein the threaded hole is provided in a bush-like portion of the vehicle-variant-specific insert part.

8. The method according to claim 7, wherein the bush-like portion has an end face which protrudes relative to an outer side of the insert part.

9. The method according to claim 7, wherein the bush-like portion terminates radially with an outer side of the insert part or protrudes radially relative to said outer side.

10. The method according to claim 1, wherein the vehicle-variant-specific insert part is welded and/or soldered and/or adhesively bonded to the subframe.

11. The method according to claim 1, wherein a bottom end of the opening receiving the vehicle-variant-specific insert part is delimited by a plate-like portion of the subframe that is arranged substantially horizontally.

12. The method according to claim 11, wherein the vehicle-variant-specific insert part has a thickened, outwardly protruding edge portion at its end facing the plate-like portion.

13. The method according to claim 2, wherein a bottom end of the opening receiving the vehicle-variant-specific insert part is delimited by a plate-like portion of the subframe that is arranged substantially horizontally wherein the plate-like portion has a recess between the at least two openings.

14. The method according to claim 1, wherein the vehicle-variant-specific insert part has at least one through-hole in addition to the connecting portion for forming a screw connection.

15. The method according to claim 1, wherein the subframe is in the form of a welded frame structure, the longitudinal members and/or the at least one crossmember being formed of or assembled from sheet metal moulded parts.

* * * * *